United States Patent
Martin et al.

(10) Patent No.: US 6,888,826 B1
(45) Date of Patent: May 3, 2005

(54) POINTER GENERATOR DESIGN THAT PROVIDES MULTIPLE OUTPUTS THAT CAN BE SYNCHRONIZED TO DIFFERENT CLOCKS

(75) Inventors: Gary D. Martin, North Andover, MA (US); William J. Anker, Londonderry, NH (US)

(73) Assignee: Applied Micro Circuits Corporation, Andover, MA (US)

( * ) Notice: Subject to any disclaimer, the term of this patent is extended or adjusted under 35 U.S.C. 154(b) by 881 days.

(21) Appl. No.: 09/875,758

(22) Filed: Jun. 6, 2001

(51) Int. Cl.[7] .................. H04L 12/50; H04Q 11/00
(52) U.S. Cl. ......................... 370/359; 370/907
(58) Field of Search ................... 370/539, 538, 370/395.7, 907, 541, 528, 529, 537, 110.4, 111, 527, 458, 522, 419, 112, 105.1, 110.1, 58.2, 58.3, 99, 101, 102, 516, 517, 518, 503; 375/354, 371, 372; 327/144, 153

(56) References Cited

U.S. PATENT DOCUMENTS

| | | | | |
|---|---|---|---|---|
| 5,241,543 A | * | 8/1993 | Amada et al. ............... | 370/509 |
| 5,245,636 A | * | 9/1993 | Sari et al. .................... | 375/372 |
| 5,430,659 A | * | 7/1995 | Miller ......................... | 702/124 |
| 5,535,219 A | * | 7/1996 | Freitas ........................ | 370/509 |
| 5,563,890 A | * | 10/1996 | Freitas ........................ | 370/476 |
| 5,699,391 A | * | 12/1997 | Mazzurco et al. .......... | 375/372 |
| 5,717,693 A | * | 2/1998 | Baydar et al. .............. | 370/514 |
| 5,790,557 A | * | 8/1998 | Lee et al. .................... | 370/535 |
| 5,835,543 A | * | 11/1998 | Mazzurco et al. .......... | 375/372 |
| 6,208,666 B1 | * | 3/2001 | Lawrence et al. .......... | 370/503 |
| 6,377,640 B2 | * | 4/2002 | Trans .......................... | 375/354 |
| 6,775,799 B1 | * | 8/2004 | Giorgetta et al. ........... | 714/751 |
| 6,782,009 B1 | * | 8/2004 | Giorgetta et al. ........... | 370/539 |
| 6,795,451 B1 | * | 9/2004 | Giorgetta et al. ........... | 370/510 |
| 6,823,137 B2 | * | 11/2004 | Fujita ........................... | 398/2 |
| 2001/0003484 A1 | * | 6/2001 | Fujita .......................... | 359/110 |
| 2001/0038674 A1 | * | 11/2001 | Trans .......................... | 375/355 |
| 2002/0110157 A1 | * | 8/2002 | Jorgenson et al. .......... | 370/537 |
| 2002/0172227 A1 | * | 11/2002 | Varelas et al. .............. | 370/514 |

\* cited by examiner

*Primary Examiner*—Wellington Chin
*Assistant Examiner*—Jamal A. Fox
(74) *Attorney, Agent, or Firm*—Weingarten, Schurgin, Gagnebin & Lebovici LLP

(57) ABSTRACT

A SONET multiplexed communications system that facilitates the sharing of processing resources while reducing overall system complexity. The SONET multiplexed communications system includes a single multi-output pointer generator clocked by a system clock and a plurality of clock domain transfer circuits having respective FIFO buffers for transferring SONET signals from the system clock domain to respective outgoing line clock domains. The multi-output pointer generator and the clock domain transfer circuits compensate for timing differences between the system clock and the respective outgoing line clocks by either skipping or overwriting FIFO buffer address locations corresponding to TOH byte positions in outgoing SONET frames. The TOH bytes corresponding to the skipped or overwritten TOH byte positions are subsequently re-generated by respective TOH insertion circuits before the outgoing SONET frames are passed through outgoing SONET lines.

19 Claims, 3 Drawing Sheets

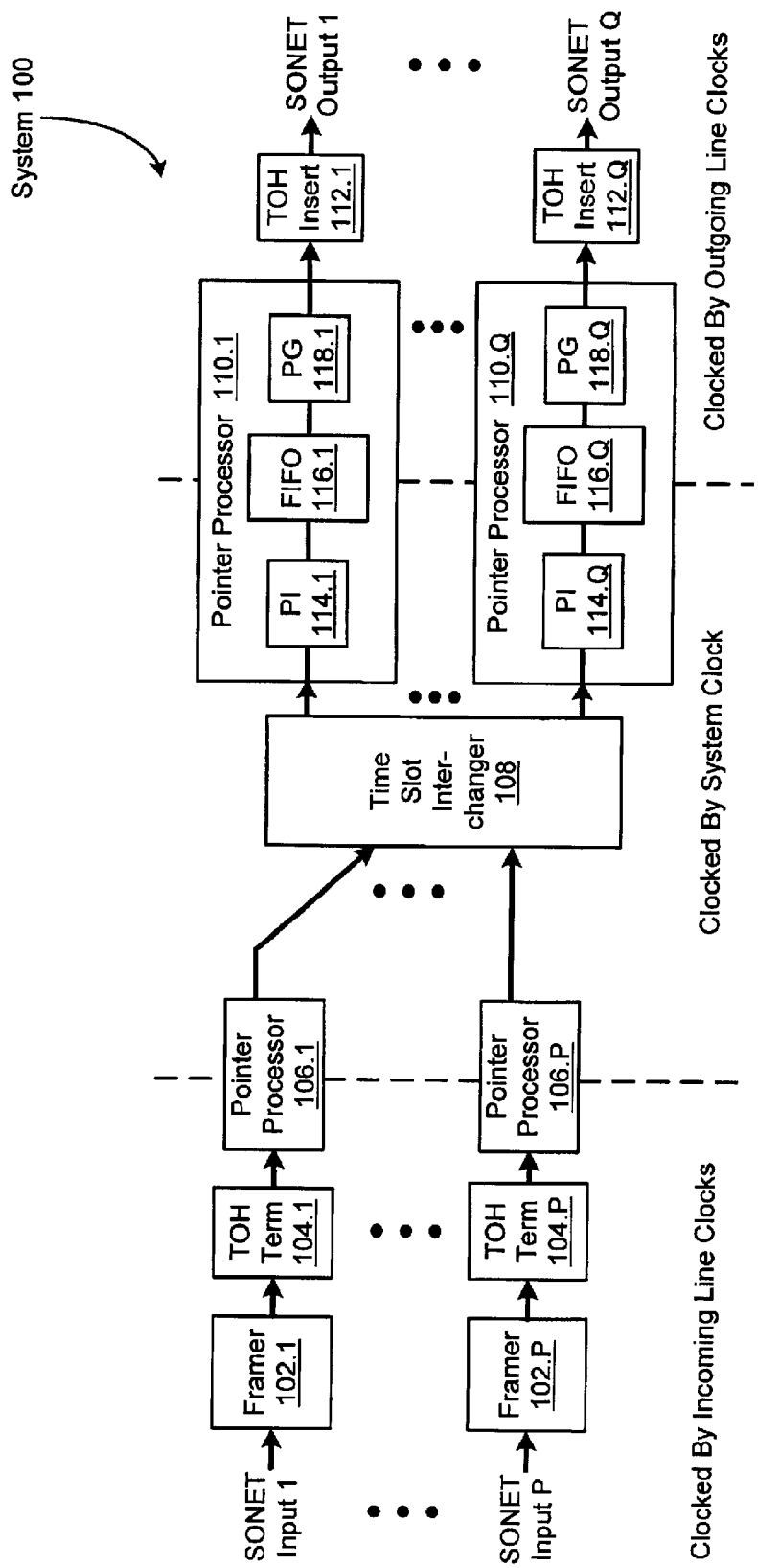
*Fig. 1 - Prior Art*

POINTER GENERATOR DESIGN THAT PROVIDES MULTIPLE OUTPUTS THAT CAN BE SYNCHRONIZED TO DIFFERENT CLOCKS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to SONET multiplexed communications systems, and more specifically to a SONET multiplexed communications system in which a single clock is employed to clock a single pointer generator to generate pointers for a plurality of outgoing SONET lines.

Synchronous Optical NETwork (SONET) multiplexed communications systems are known that employ time division multiplex switching techniques to route digital information between a plurality of incoming SONET lines and a plurality of outgoing SONET lines. A conventional SONET multiplexed communications system includes a plurality of incoming SONET lines, a plurality of outgoing SONET lines, and a Time Slot Interchanger (TSI) disposed between the incoming SONET lines and the outgoing SONET lines. The TSI is configured to receive digital information contained in respective time slots from the plurality of incoming SONET lines, temporarily store the digital information received during each time slot, and re-transmit that information during another time slot associated with at least one outgoing SONET line. In this way, the TSI operates as a cross-switch to route digital information from an incoming SONET line associated with a first time slot to at least one outgoing SONET line associated with a second time slot.

In the conventional SONET multiplexed system, the plurality of incoming SONET lines are clocked by respective incoming line clocks, the plurality of outgoing SONET lines are clocked by respective outgoing line clocks, and the TSI is clocked by a system clock. Because the clock rates of the incoming line clocks and the system clock may be different, respective pointer processors are typically disposed in the incoming SONET lines to compensate for timing differences between the incoming line clocks and the system clock. Similarly, because the clock rates of the system clock and the outgoing line clocks may be different, respective pointer processors are typically disposed in the outgoing SONET lines to compensate for timing differences between the system clock and the outgoing line clocks.

One drawback of the conventional SONET multiplexed communications system is that significant portions of the system are clocked at different clock rates. Specifically, significant portions of the incoming pointer processors are clocked at the incoming line clock rates while remaining portions of these pointer processors are clocked at the system clock rate. Similarly, significant portions of the outgoing pointer processors are clocked at the outgoing line clock rates while remaining portions of these pointer processors are clocked at the system clock rate. Further, the TSI is typically clocked only at the system clock rate.

Requiring significant portions of the conventional SONET multiplexed communications system to be clocked at different clock rates can make it harder to share processing resources in the communications system. Such sharing of processing resources may take place, e.g., when processing multiple combinations of concatenated SONET frame formats and/or multiple combinations of SONET bandwidths on outgoing SONET lines. Clocking significant portions of the SONET multiplexed communications system at different clock rates can also increase system complexity, which can be problematic for systems implemented on integrated circuits. This is because increased system complexity often leads to increased die sizes, which can reduce yields and increase manufacturing costs.

It would therefore be desirable to have a SONET multiplexed communications system that facilitates the sharing of processing resources while reducing overall system complexity. Such a SONET multiplexed communications system would more easily handle the generation of pointers for a plurality of outgoing SONET lines, and allow increased integration to improve yields and reduce manufacturing costs.

BRIEF SUMMARY OF THE INVENTION

In accordance with the present invention, a SONET multiplexed communications system is provided that facilitates the sharing of processing resources while reducing overall system complexity. The benefits of the presently disclosed communications system are achieved by configuring the system so that an increased portion of the system is clocked by a single clock.

In one embodiment, the SONET multiplexed communications system includes a plurality of incoming SONET lines clocked by respective incoming line clocks, a plurality of outgoing SONET lines clocked by respective outgoing line clocks, and a Time Slot Interchanger (TSI) clocked by a system clock and operatively disposed between the incoming SONET lines and the outgoing SONET lines. The system further includes a single Pointer Interpreter (PI), a single First-In First-Out (FIFO) buffer, and a single multi-output Pointer Generator (PG) clocked by a single clock, e.g., the system clock, and serially coupled at an output of the TSI; and, a plurality of respective clock domain transfer circuits having inputs clocked by the system clock and outputs clocked by the outgoing line clocks operatively disposed between the multi-output PG and respective Transport OverHead (TOH) byte insertion circuits in the outgoing SONET lines. The combination of the single PI, the single FIFO buffer, the single multi-output PG, and the respective clock domain transfer circuits compensates for timing differences between the system clock and the outgoing line clocks by either skipping or overwriting at least one FIFO buffer address location corresponding to a TOH byte position in at least one outgoing SONET frame. The TOH byte corresponding to the skipped or overwritten TOH byte position is subsequently re-generated by the TOH insertion circuit before the outgoing SONET frame is passed through the outgoing SONET line.

The single multi-output PG includes a plurality of intra-frame counters, in which each intra-frame counter is coupled to a respective TOH byte location circuit. Each intra-frame counter is associated with a respective clock domain transfer circuit, and each clock domain transfer circuit is associated with a respective outgoing SONET line. The single multi-output PG further includes a PG sub-circuit coupled between the intra-frame counters and the clock domain transfer circuits.

Each intra-frame counter coupled to a TOH byte location circuit is configured to keep track of which byte positions of each outgoing SONET frame are being operated on during the processing of that frame by the respective clock domain transfer circuit. Further, each intra-frame counter is capable of selectively advancing by two (2) counts in response to a single cycle of the system clock ("advancing-by-two") or not advancing for a single cycle of the system clock ("retarding"). In the event a TOH byte position of a SONET frame is currently being operated on by the respective clock domain transfer circuit, the TOH byte location circuit sends an inquiry signal to the clock domain transfer circuit, which may send at least one control signal in response to the inquiry signal for selectively advancing-by-two or retarding the intra-frame counter to adjust the timing of the PG sub-circuit as at least one TOH byte position of the outgoing SONET frame is being skipped or overwritten.

Each clock domain transfer circuit includes two (2) FIFO buffers of equal depth. Specifically, a 1-bit wide synchronization FIFO buffer is configured to pass a 1-bit synchronization signal indicating the start of an outgoing SONET frame from the outgoing line clock domain to the system clock domain, or from the system clock domain to the outgoing line clock domain, depending upon where the source of the 1-bit synchronization signal resides. A data FIFO buffer is configured to pass data from the PG sub-circuit in the system clock domain to the outgoing line clock domain. The data FIFO buffer provides the bandwidth necessary to accommodate the data rate of the outgoing line. Each clock domain transfer circuit further includes two (2) address counters for circularly counting through respective address spaces of the synchronization FIFO buffer and the data FIFO buffer. In the presently disclosed embodiment, a first address counter is a free-running counter clocked by the outgoing line clock and operatively coupled to the synchronization FIFO buffer and the data FIFO buffer. Further, a second address counter clocked by the system clock is operatively coupled to the synchronization FIFO buffer and the data FIFO buffer and configured for free-running, advancing-by-two, or retarding.

Moreover, each clock domain transfer circuit includes a FIFO fill calculation circuit configured to receive the inquiry signal from the TOH byte location circuit, and calculate in response to the inquiry signal whether the respective FIFO buffers are "nearly full" or "nearly empty".

In the event the calculation shows that the respective FIFO buffers are nearly empty, the FIFO fill calculation circuit sends at least one control signal to the intra-frame counter and the second address counter of the clock domain transfer circuit, thereby causing these counters to advance-by-two. The advancing second address counter causes the data FIFO buffer to skip at least one address location corresponding to a TOH byte position in the outgoing SONET frame, and similarly causes the synchronization FIFO buffer to skip at least one address location for correctly indicating the start of the next outgoing SONET frame. Further, the advancing intra-frame counter causes the PG sub-circuit to adjust its timing to account for the skipped address locations.

In the event the calculation shows that the respective FIFO buffers are nearly full, the FIFO fill calculation circuit sends at least one control signal to the intra-frame counter and the above-mentioned second address counter to cause these counters to retard. The retarding second address counter causes the data FIFO buffer to overwrite at least one address location corresponding to a TOH byte position, and similarly causes the synchronization FIFO buffer to overwrite at least one address location for correctly indicating the start of the next outgoing SONET frame. Further, the retarding intra-frame counter causes the PG sub-circuit to adjust its timing to account for the overwritten address locations. The TOH bytes corresponding to the skipped or overwritten TOH byte positions are subsequently regenerated by the TOH byte insertion circuit before the outgoing SONET frame is passed through the outgoing SONET line.

By providing a single PI, a single FIFO buffer, and a single multi-output PG disposed in a system clock domain and coupled to respective clock domain transfer circuits interfacing the system clock domain and outgoing line clock domains, an increased portion of a SONET multiplexed communications system can be clocked by a single clock. This facilitates the sharing of resources in the multi-output pointer generator, e.g., when generating pointers for a plurality of outgoing SONET lines. In the presently disclosed embodiment, the single PI, the single FIFO buffer, and the PG sub-circuit are shared among the plurality of outgoing SONET lines by configuring the single PI to provide a plurality of logical PI's, by configuring the single FIFO buffer to provide a corresponding plurality of logical FIFO buffers, and by configuring the PG sub-circuit to extract data from the plurality of logical FIFO buffers for subsequent transmission on the respective outgoing SONET lines. Having an increased portion of the SONET multiplexed communications system clocked by a single clock also reduces system complexity.

Moreover, by configuring the clock domain transfer circuits so that at least one TOH byte position in each outgoing SONET frame can be effectively skipped or overwritten, relatively small synchronization and data FIFO buffers can be employed to compensate for timing differences between the system clock and outgoing line clocks. The relatively small FIFO buffers along with the reduced complexity of the overall system allows increased integration when implementing the SONET multiplexed communications system on an integrated circuit.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 1 is a block diagram of a conventional SONET multiplexed communications system;

FIG. 2b is a block diagram of a multi-output pointer generator and a clock domain transfer circuit included in the SONET multiplexed communications system of FIG. 2a.

DETAILED DESCRIPTION OF THE INVENTION

Figure 2A:
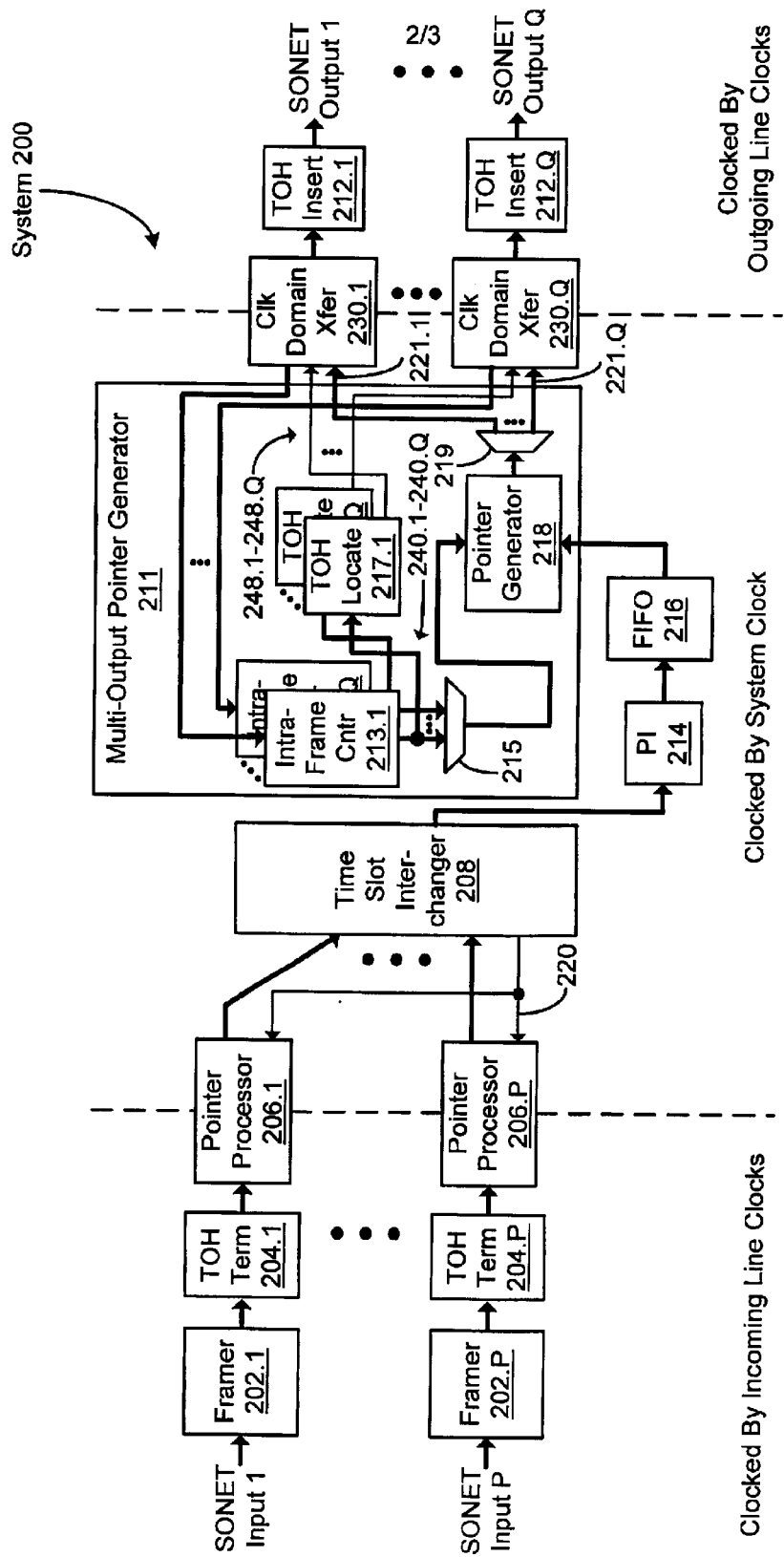
FIG. 2a is a block diagram of a SONET multiplexed communications system according to the present invention.

A Synchronous Optical NETwork (SONET) multiplexed communications system is disclosed that is configured to facilitate the sharing of processing resources included therein while reducing overall system complexity. The presently disclosed communications system achieves such benefits by allowing an increased portion of the system to be clocked by a single clock.

SONET is a set of standards for synchronous data transmission over fiber optic networks published by the American National Standards Institute (ANSI). Synchronous Digital Hierarchy (SDH) is the international version of such standards for synchronous data transmission published by the International Telecommunications Union (ITU). It should be understood that the presently disclosed communications system may be implemented according to either the SONET Standard or the SDH Standard. The presently disclosed communications system is described herein with reference to the SONET Standard for purposes of illustration.

According to the SONET Standard, electronic signals are formatted in Synchronous Transport Signal (STS) frames. Specifically, a basic STS-1 frame comprises nine (9) rows of bytes by ninety (90) columns of bytes. The first three (3) columns of the STS-1 frame contain Transport OverHead (TOH) bytes, and the remaining eighty-seven (87) columns contain Synchronous Payload Envelope (SPE) bytes. The eighty-seven (87) columns of SPE bytes include one (1) column of Path OverHead (POH) bytes, two (2) columns of fixed "stuff" bytes, and eighty-four (84) columns of payload data bytes. Each row of the STS-1 frame therefore typically includes three (3) TOH bytes, one (1) POH byte, two (2) fixed stuff bytes, and eighty-four (84) payload data bytes. It is noted that the first row of the STS-1 frame includes the TOH bytes A1 and A2, which form a framing pattern of bits indicative of the start of the frame ("frame start indicator"). Further, the fourth row of the STS-1 frame includes the TOH bytes H1, H2, and H3. The H1H2 bytes comprise a pointer to the start of the SPE bytes of the STS-1 frame, and the H3 byte comprises a positive/negative justification byte.

Specifically, for positive justification of a SONET output signal relative to a SONET input signal, the fourth row includes an additional stuff byte following the H3 byte that displaces the POH byte, one of the two (2) fixed stuff bytes, or one of the eighty-four (84) payload data bytes. For example, in the event the additional stuff byte displaces the POH byte, the fourth row may include the three (3) TOH bytes (H1, H2, and H3), the additional stuff byte that replaces the POH byte, the two (2) fixed stuff bytes, and the eighty-four (84) payload data bytes. For negative justification of a SONET output signal relative to a SONET input signal, the fourth row includes an additional POH byte, an additional fixed stuff byte, or an additional payload data byte in the H3 byte position. For example, in the event that an additional POH byte is in the H3 byte position, the fourth row may include the two (2) TOH bytes (H1 and H2), the additional POH byte in the H3 byte position, the POH byte in the normal POH byte position, the two (2) fixed stuff bytes, and the eighty-four (84) payload data bytes.

Like the basic STS-1 frame, a concatenated STS-Nc frame comprises nine (9) rows of bytes. Each row of the STS-Nc frame typically includes three (3) N-byte columns of TOH bytes, and eighty-seven (87) N-byte columns of SPE bytes. The first column of the SPE bytes contains one (1) POH byte, [(N/3)-1] fixed stuff bytes, and 2N/3 payload data bytes; and, each of the remaining eighty-six (86) columns of the SPE bytes contains N payload data bytes. Further, the first row of the STS-Nc frame includes the above-mentioned TOH bytes A1 and A2, and the fourth row of the STS-Nc frame includes N groups of TOH bytes H1, H2, and H3. For positive justification of a SONET output signal relative to a SONET input signal, the fourth row includes N respective additional stuff bytes following the N H3 bytes, and 86N SPE bytes. For negative justification of a SONET output signal relative to a SONET input signal, the fourth row includes N respective additional SPE bytes in the N H3 byte positions to produce 88N SPE bytes.

It is noted that M (M>1) STS-1 tributaries may be multiplexed together to form a single STS-M frame by, e.g., interleaving the STS-1 tributaries one byte at a time. Each row of the resulting STS-M frame typically includes eighty-seven (87) columns of SPE bytes, in which each column includes M time slots of one (1) byte each for each one of the M STS-1 tributaries. Further, an STS-M frame may contain a combination of multiplexed STS-1 tributaries and/or STS-Nc tributaries, in which N≦M.

FIG. 1 depicts a block diagram of a conventional SONET multiplexed communications system 100 configured to route digital information between a plurality of incoming SONET lines 1–P and a plurality of outgoing SONET lines 1–Q, in which P may or may not be equal to Q. The plurality of incoming SONET lines 1–P are clocked by respective incoming line clocks, and the plurality of outgoing SONET lines 1–Q are clocked by respective outgoing line clocks.

The conventional SONET multiplexed system 100 includes a Time Slot Interchanger (TSI) 108 configured to receive digital information contained in respective time slots from the plurality of incoming SONET lines 1–P, temporarily store the digital information received in each time slot, and re-transmit that information during another time slot associated with one of the plurality of outgoing SONET lines 1–Q. In the illustrated embodiment, the TSI 108 is clocked by a system clock.

Because the clock rates of the incoming line clocks may be different from that of the system clock, the incoming SONET lines 1–P include respective pointer processors 106.1–106.P configured, at least in part, to compensate for timing differences between the incoming line clocks and the system clock. Similarly, because the clock rate of the system clock may be different from those of the outgoing line clocks, the outgoing SONET lines 1–Q include respective pointer processors 110.1–110.Q configured, at least in part, to compensate for timing differences between the system clock and the outgoing line clocks.

Specifically, the incoming SONET lines 1–P include respective framer circuits 102.1–102.P, respective TOH termination circuits 104.1–104.P, and the respective pointer processors 106.1–106.P. The outgoing SONET lines 1–Q include the respective pointer processors 110.1–110.Q, and respective TOH insertion circuits 112.1–112.Q.

It is noted that the pointer processors 106.1–106.P are like the pointer processors 110.1–110.Q, which include respective Pointer Interpreters (PI's) 114.1–114.Q, respective First-In First-Out (FIFO) buffers 116.1–116.Q, and respective Pointer Generators (PG's) 118.1–118.Q. Further, the respective PI's (not shown) and inputs of the respective FIFO buffers (not shown) of the pointer processors 106.1–106.P are clocked by the respective incoming line clocks; and, outputs of the respective FIFO buffers and the respective PG's (not shown) of the pointer processors 106.1–106.P are clocked by the system clock. Moreover, the respective PI's 114.1–114.Q and inputs of the respective FIFO buffers 116.1–116.Q of the pointer processors 110.1–110.Q are clocked by the system clock; and, outputs of the respective FIFO buffers 116.1–116.Q and the respective PG's 118.1–118.Q of the pointer processors 110.1–110.Q are clocked by the respective outgoing line clocks.

It should be appreciated that because the clock rates of the incoming line clocks, the system clock, and the outgoing line clocks may be different, significant portions of the conventional SONET multiplexed communications system 100 may be clocked at different clock rates. This can make it harder to share processing resources in the conventional SONET multiplexed communications system 100, and can increase the complexity of the system.

FIG. 2a depicts a block diagram of an illustrative embodiment of a SONET multiplexed communications system 200 in accordance with the present invention. The SONET multiplexed communications system 200 facilitates the sharing of processing resources and reduces overall system complexity by way of a configuration in which an increased portion of the system is clocked by a single clock.

As in the conventional SONET multiplexed communications system 100 (see FIG. 1), the SONET multiplexed communications system 200 is configured to route digital information between a plurality of incoming SONET lines 1–P and a plurality of outgoing SONET lines 1–Q (in which P may or may not be equal to Q) by way of a TSI 208 disposed therebetween. The plurality of incoming SONET lines 1–P are clocked by respective incoming line clocks, the plurality of outgoing SONET lines 1–Q are clocked by respective outgoing line clocks, and the TSI 208 is clocked by the system clock.

Specifically, the incoming SONET lines 1–P include respective framer circuits 202.1–202.P and respective TOH termination circuits 204.1–204.P clocked by the incoming line clocks. The respective framer circuits 202.1–202.P are configured to perform byte alignment on incoming SONET frames, and the respective TOH termination circuits 204.1–204.P are configured to detect TOH bytes in the incoming SONET frames and remove the TOH bytes except for the H1H2 bytes (which are subsequently interpreted by respective PI's included in pointer processors 206.1–206.P) and the H3 byte in the fourth row (which may be employed for positive/negative justifications). The pointer processors 206.1–206.P include the respective PI's (not shown) clocked by an incoming line clock, respective FIFO buffers (not shown) having inputs clocked by the incoming line clock and outputs clocked by the system clock, and respective PG's (not shown) clocked by the system clock.

The respective pointer processors 206.1–206.P are configured, at least in part, to compensate for timing differences between the incoming line clocks and the system clock. Further, the respective pointer processors 206.1–206.P are configured to perform frame alignment on the incoming SONET frames. For this reason, the TSI 208 includes control circuitry (not shown) configured to generate a frame sync pulse, which is typically asserted at a rate of 1 pulse/frame. The TSI 208 provides the frame sync pulse to the pointer processors 206.1–206.P by way of a line 220 for use in performing frame alignment. It is understood that the frame sync pulse may alternatively be provided by way of external independent control circuitry (not shown).

The TSI 208 is configured to receive the processed incoming SONET frames from the plurality of incoming SONET lines 1–P, temporarily store the frame information received in each time slot, and re-transmit that information as outgoing SONET frames during another time slot associated with one of the plurality of outgoing SONET lines 1–Q.

According to the present invention, a single PI 214, a single FIFO buffer 216, and a single multi-output Processor Generator (PG) 211 are clocked by the system clock and provided between the TSI 208 and the outgoing SONET lines 1–Q. Further, the outgoing SONET lines 1–Q include respective clock domain transfer circuits 230.1–230.Q coupled to a plurality of outputs 221.1–221.Q of the multi-output PG 211. The combination of the single PI 214, the single FIFO buffer 216, the single multi-output PG 211, and the respective clock domain transfer circuits 230.1–230.Q compensates for timing differences between the system clock and the outgoing line clocks. Moreover, by providing the single PI 214, the single FIFO buffer 216, and the single multi-output PG 211 clocked by the system clock, an increased portion of the SONET multiplexed communications system 200 is clocked by a single clock, which facilitates the sharing of processing resources in the system and reduces overall system complexity.

The multi-output PG 211 and the respective clock domain transfer circuits 230.1–230.Q coupled thereto compensate for the timing differences between the system clock and the outgoing line clocks by causing respective data FIFO buffers (see FIG. 2b) included in the clock domain transfer circuits 230.1–230.Q to skip or overwrite at least one address location corresponding to a TOH byte position in at least one of the plurality of outgoing SONET frames. It should be noted that the skipped or overwritten TOH byte positions may occur anywhere within the columns of TOH bytes in the outgoing SONET frames. Further, the TOH bytes corresponding to the skipped or overwritten TOH byte positions are subsequently re-generated by respective TOH insertion circuits 212.1–212.Q disposed in the outgoing SONET lines 1–Q.

Specifically, the multi-output PG 211 includes a single PG sub-circuit 218, a plurality of intra-frame counters 213.1–213.Q, and a plurality of TOH location circuits 217.1–217.Q. Further, each of the intra-frame counters 213.1–213.Q, the TOH location circuits 217.1–217.Q, and the clock domain transfer circuits 230.1–230.Q is associated with a respective one of the outgoing SONET lines 1–Q.

The intra-frame counters 213.1–213.Q are configured to keep track of which byte positions of the outgoing SONET frames are currently being operated on by the clock domain transfer circuits 230.1–230.Q during the transmission of those frames on the outgoing SONET lines 1–Q. The intra-frame counters 213.1–213.Q receive a plurality of control signals from the respective clock domain transfer circuits 230.1–230.Q, and provide a plurality of outputs on buses 240.1–240.Q to the PG sub-circuit 218 by way of a multiplexor 215. The outputs on the buses 240.1–240.Q represent row, column, and tributary information for each outgoing SONET line 1–Q.

As mentioned above, the multi-output PG 211 and the respective clock domain transfer circuits 230.1–230.Q compensate for the timing differences between the system clock and the outgoing line clocks by causing the respective data FIFO buffers in the clock domain transfer circuits 230.1–230.Q to effectively skip or overwrite at least one TOH byte position in at least one of the outgoing SONET frames. In the illustrated embodiment, the intra-frame counters 213.1–213.Q are configured to selectively advance by two (2) counts for a single cycle of the system clock ("advance-by-two"), or not advance for a single system clock cycle ("retard"), in response to at least one of the control signals received from the clock domain transfer circuits 230.1–230.Q, thereby causing the PG sub-circuit 218 to adjust its timing to account for the skipped or overwritten TOH byte positions.

The TOH location circuits 217.1–217.Q are configured to monitor the row, column, and tributary information provided by the intra-frame counters 213.1–213.Q via the outputs 240.1–240.Q to locate the TOH byte positions in the outgoing SONET frames, and provide inquiry signals to the clock domain transfer circuits 230.1–230.Q via outputs 248.1–248.Q upon the location of the TOH byte positions. It is noted that the control signals provided by the clock domain transfer circuits 230.1–230.Q to the intra-frame counters 213.1–213.Q are generated in response to the inquiry signals provided by the TOH location circuits 217.1–217.Q to the clock domain transfer circuits 230.1–230.Q.

In the illustrated embodiment, the PI 214 comprises a plurality of logical PI's 1–Q, and the FIFO buffer 216 comprises a plurality of logical FIFO buffers 1–Q configured for temporarily storing outgoing SONET frames destined for transmission on the respective outgoing SONET lines 1–Q. The PG sub-circuit 218 is configured to receive the outgoing SONET frames from the FIFO buffer 216; monitor the row, column, and tributary information provided by the intra-frame counters 213.1–213.Q by way of the multiplexor 215; adjust its timing based on the monitored row/column/tributary information to account for the TOH byte positions skipped or overwritten by the respective data FIFO buffers included in the clock domain transfer circuits 230.1–230.Q; and, provide the outgoing SONET frames to the appropriate clock domain transfer circuits 230.1–230.Q by way of a de-multiplexor 219.

Figure 2B:
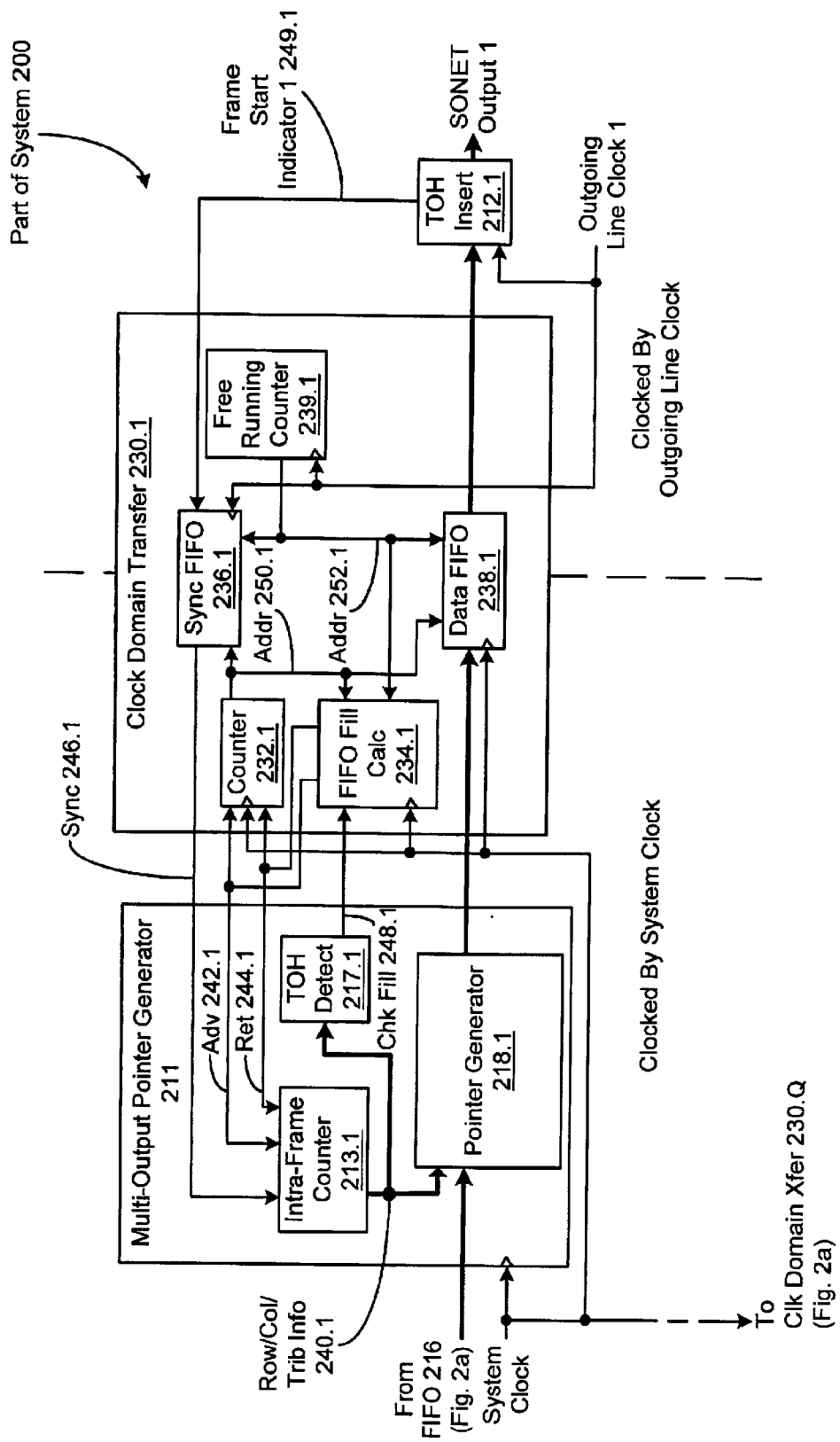

FIG. 2b depicts block diagrams of illustrative embodiments of the multi-output PG 211 and the clock domain transfer circuit 230.1 included in the SONET multiplexed communications system 200 (see FIG. 2a). It is noted that each of the clock domain transfer circuits 230.2–230.Q is like the clock domain transfer circuit 230.1. Further, because FIG. 2b depicts the single intra-frame counter 213.1 and the single clock domain transfer circuit 230.1, the multiplexer 215 disposed between the intra-frame counters 213.1–213.Q and the PG sub-circuit 218, and the de-multiplexor 219 disposed between the PG sub-circuit 218 and the clock domain transfer circuits 230.1–230.Q, are omitted.

In the illustrated embodiment, the multi-output PG 211, and the inputs of the clock domain transfer circuit 230.1, are clocked by the system clock. Further, the outputs of the clock domain transfer circuit 230.1 are clocked by an outgoing line clock 1. It is understood that the system clock and outgoing line clocks 1–Q may be provided by external independent clock generation circuitry (not shown).

The intra-frame counter 213.1 receives a plurality of control signals on lines 242.1, 244.1, and 246.1 from the clock domain transfer circuit 230.1, and provides outputs on a bus 240.1 representative of row, column, and tributary information for each outgoing SONET line 1–Q to the PG sub-circuit 218.1 and the TOH location circuit 217.1. Specifically, the plurality of control signals received by the intra-frame counter 213.1 includes an advance-by-two signal on the line 242.1 that causes the intra-frame counter 213.1 to advance by two (2) counts in response to a single cycle of the system clock, a retard signal on the line 244.1 that causes the intra-frame counter 213.1 not to advance for a single cycle of the system clock, and a "frame-sync" signal on the line 246.1 indicative of the start of an outgoing SONET frame ("frame start indicator").

The TOH location circuit 217.1 monitors the row, column, and tributary information on the bus 240.1, and provides a "check-fill" inquiry signal on a line 248.1 to the clock domain transfer circuit 230.1 upon the location of a TOH byte position in an outgoing SONET frame.

In the illustrated embodiment, the clock domain transfer circuit 230.1 includes a first address counter 232.1 clocked by the system clock, and a second address counter 239.1 clocked by the outgoing line clock 1. The first address counter 232.1 is configured for free-running, advancing by two (2) counts in response to a single cycle of the system clock, or not advancing for a single cycle of the system clock; and, the second address counter 239.1 is configured for free-running.

The clock domain transfer circuit 230.1 further includes a synchronization FIFO buffer ("sync buffer") 236.1 and a data FIFO buffer ("data buffer") 238.1 of equal depth. The input of the sync buffer 236.1 is clocked by the outgoing line clock 1, and the output of the sync buffer 236.1 is clocked by the first address counter 232.1. The input of the data buffer 238.1 is clocked by the first address counter 232.1, and the output of the data buffer 238.1 is clocked by the second address counter 239.1. For example, the sync buffer 1236.1 and the data buffer 238.1 may comprise respective dual-port Random Access Memories (RAM's).

In the illustrated embodiment, the sync buffer 236.1 is 1-bit wide and configured to pass an outgoing SONET frame start indicator 1 on a line 249.1 from the domain of the outgoing line clock 1 back to the system clock domain, thereby providing the frame-sync signal to the intra-frame counter 213.1 on the line 246.1. Further, the data buffer 238.1 is configured to pass the outgoing SONET frames from the system clock domain to the domain of the outgoing line clock 1.

Moreover, the clock domain transfer circuit 230.1 includes a FIFO fill calculation circuit 234.1 clocked by the system clock. The FIFO fill calculation circuit 234.1 is configured to receive the check-fill inquiry signal from the TOH location circuit 217.1 on the line 248.1; monitor outputs of the first and second address counters 232.1 and 239.1 on respective lines 250.1 and 252.1; upon receipt of the check-full inquiry signal, use the monitored outputs to calculate whether the sync and data buffers 236.1 and 238.1 are nearly full or nearly empty; and, provide the retard or advance-by-two signal to the intra-frame counter 213.1 and the first address counter 232.1 based on results of the above calculation.

Specifically, the input of the sync buffer 236.1 is continuously written at a clock rate determined by the outgoing line clock 1, and the output of the data buffer 238.1 is continuously read at a clock rate determined by the second address counter 239.1. Further, the output of the sync buffer 236.1 is read, and the input of the data buffer 238.1 is written, at a clock rate determined by the first address counter 232.1.

In the event the calculation performed by the FIFO fill calculation circuit 234.1 shows that the sync and data buffers 236.1 and 238.1 are nearly full, the FIFO fill calculation circuit 234.1 sends the retard signal to the first address counter 232.1, thereby causing the first address counter 232.1 to retard and causing the sync and data buffers 236.1 and 238.1 to overwrite a single address location. In the event the calculation performed by the FIFO fill calculation circuit 234.1 shows that the sync and data buffers 236.1 and 238.1 are nearly empty, the FIFO fill calculation circuit 234.1 sends the advance-by-two signal to the first address counter 232.1, thereby causing the first address counter 232.1 to advance-by-two and causing the sync and data buffers 236.1 and 238.1 to skip a single address location. As explained above, the overwritten or skipped address locations of the data buffer 238.1 correspond to respective TOH byte positions in the outgoing SONET frames.

In the illustrated embodiment, a maximum of one (1) column of TOH bytes is overwritten/skipped for every four (4) consecutive STS-1 frames. For higher rate SONET lines, such column adjustments for TOH bytes are distributed over four (4) consecutive STS frames. For example, an STS-12 line has twelve (12) columns of TOH bytes that may be adjusted every four (4) frames, i.e., three (3) columns per frame. By evenly distributing the TOR column adjustments, the depth of the data buffer 238.1 can be minimized.

The PG sub-circuit 218.1 is clocked by the system clock, and configured to receive the outgoing SONET frames from the FIFO buffer 216; monitor the row, column, and tributary information provided by the intra-frame counter 213.1; adjust its timing based on the monitored row/column/tributary information to account for address locations overwritten or skipped by the sync and data buffers 236.1 and 238.1; and, provide the outgoing SONET frames to the data FIFO buffer 238.1 of the clock domain transfer circuit 230.1. For example, the PG sub-circuit 218.1 may adjust its timing to account for the overwritten or skipped address locations by suitably adjusting the extraction rate of data from the FIFO buffer 216.

The TOH insertion circuit 212.1 is configured to re-generate the TOH bytes corresponding to the overwritten or skipped TOH byte positions in the outgoing SONET frames. It should be noted that the re-generated TOH bytes include the TOH bytes A1 and A2 representing the frame start indicator 1 provided to the sync buffer 236.1 on the line 249.1.

Because the multi-output PG 211 (see FIG. 2a) comprising the PG sub-circuit 218 is clocked by a single clock, i.e., the system clock, the overall system complexity is reduced and the sharing of processing resources is made easier. For example, the PI 214, the FIFO buffer 216, and the PG sub-circuit 218 may be easily shared among the plurality of outgoing SONET lines 1–Q by (1) employing the multiplexor 215 to access row/column/tributary information for the outgoing SONET lines 1-Q, (2) interpreting pointers of outgoing SONET frames provided by the TSI 208 using respective logical PI's 1–Q corresponding to the outgoing SONET lines 1–Q, (3) storing the outgoing SONET frames in respective logical FIFO buffers 1–Q corresponding to the outgoing SONET lines 1–Q, and (4) employing the de-multiplexor 219 to provide the outgoing SONET frames to respective clock domain transfer circuits disposed in the outgoing SONET lines 1–Q.

Moreover, by reducing the overall system complexity and evenly distributing the TOH column adjustments to minimize the depth of the data buffer 238.1 (and the depth of the sync buffer 236.1; see FIG. 2b), integration is increased when implementing the SONET multiplexed communications system 200 on an integrated circuit.

It will further be appreciated by those of ordinary skill in the art that modifications to and variations of the above-described SONET multiplexed communications system may be made without departing from the inventive concepts disclosed herein. Accordingly, the invention should not be viewed as limited except as by the scope and spirit of the appended claims.

What is claimed is:

1. A SONET multiplexed communications system, comprising:
    pointer processing circuitry clocked by a first clock, the pointer processing circuitry being configured to process at least one SONET signal comprising data and overhead information;
    at least one overhead information insertion circuit clocked by a second clock, the insertion circuit being configured to re-generate the overhead information and insert the re-generated overhead information in the SONET signal; and
    at least one clock domain transfer circuit coupled between the pointer processing circuitry and the insertion circuit, the clock domain transfer circuit including at least one first buffer having a plurality of addressable locations configured to store the data and overhead information of the SONET signal,
    wherein the clock domain transfer circuit is configured to compensate for timing differences between the first and second clocks by addressing the plurality of first buffer locations for selectively overwriting or skipping at least one location corresponding to the overhead information of the SONET signal.

2. The multiplexed communications system of claim 1 wherein the pointer processing circuitry includes a monitor circuit configured to determine which first buffer location corresponding to the data and overhead information of the SONET signal is being addressed by the clock domain transfer circuit.

3. The multiplexed communications system of claim 2 wherein the clock domain transfer circuit further includes a buffer fill calculation circuit clocked by the first clock and configured to determine whether the first buffer is nearly full or nearly empty upon receipt of an inquiry signal.

4. The multiplexed communications system of claim 3 wherein the monitor circuit is further configured to send the inquiry signal to the buffer fill calculation circuit in the event it is determined that the first buffer location corresponding to the overhead information is being addressed by the clock domain transfer circuit.

5. The multiplexed communications system of claim 3 wherein the buffer fill calculation circuit is further configured to cause the clock domain transfer circuit to address the plurality of first buffer locations for overwriting at least one location corresponding to the overhead information in the event the first buffer is determined to be nearly full.

6. The multiplexed communications system of claim 3 wherein the buffer full calculation circuit is further configured to cause the clock domain transfer circuit to address the plurality of first buffer locations for skipping at least one location corresponding to the overhead information in the event the first buffer is determined to be nearly empty.

7. The SONET multiplexed communications system of claim 2 wherein the SONET signal comprises at least one multi-byte frame and the overhead information re-generated by the overhead information insertion circuit includes a frame start indicator for the multi-byte frame, the monitor circuit being further configured to use the frame start indicator for determining which first buffer location corresponding to the data and overhead information of the SONET signal is being addressed by the clock domain transfer circuit.

8. The SONET multiplexed communications system of claim 7 wherein the clock domain transfer circuit further includes at least one second buffer having a plurality of addressable locations configured to receive the frame start indicator from the overhead information insertion circuit, store the frame start indicator, and provide the frame start indicator to the monitor circuit.

9. The SONET multiplexed communications system of claim 8 wherein the first buffer and the second buffer have the same depth.

10. The SONET multiplexed communications system of claim 3 wherein the monitor circuit includes a counter and an overhead information location circuit, the counter being configured to provide a plurality of outputs representing at least row and column information for the SONET signal, the location circuit being configured to locate at least one first buffer location corresponding to the overhead information of the SONET signal.

11. The SONET multiplexed communications system of claim 1 wherein the pointer processing circuitry includes a single pointer interpreter, a single pointer generator, and a single first-in first-out buffer coupled between the pointer interpreter and the pointer generator, and the pointer processing circuitry is further configured to modify an extraction of data from the single first-in first-out buffer to account for the overwriting or skipping of at least one first buffer location corresponding to the overhead information of the SONET signal by the clock domain transfer circuit.

12. The SONET multiplexed communications system of claim 1 wherein the clock domain transfer circuit further includes a first counter clocked by the first clock and a second counter clocked by the second clock, the first buffer having at least one input clocked by the first counter and at least one output clocked by the second counter.

13. The SONET multiplexed communications system of claim 12 wherein the clock domain transfer circuit is configured to compensate for timing differences between the first and second clocks by selectively causing the first counter to advance by two counts for a single cycle of the first clock in the event the first buffer is nearly empty or not advance for a single cycle of the first clock in the event the first buffer is nearly full.

14. The SONET multiplexed communications system of claim 11 wherein the single pointer interpreter comprises a plurality of logical pointer interpreters configured to process the respective SONET signals.

15. The SONET multiplexed communications system of claim 11 wherein the single first-in first-out buffer comprises a plurality of logical first-in first-out buffers configured to store the respective SONET signals.

16. A method of operating a SONET multiplexed communications system, comprising the steps of:

processing at least one SONET signal comprising data and overhead information by pointer processing circuitry clocked by a first clock;

storing the data and overhead information of the SONET signal by a respective first buffer disposed in at least one clock domain transfer circuit, the first buffer having a plurality of addressable locations;

compensating for timing differences between the first clock and a second clock by addressing the plurality of first buffer locations for selectively overwriting or skipping at least one location corresponding to the overhead information of the SONET signal by the clock domain transfer circuit; and re-generating the overhead information and inserting the re-generated information in the SONET signal by at least one overhead information insertion circuit clocked by the second clock.

17. The method of claim 16 wherein the processing step includes processing a plurality of SONET signals comprising respective data and overhead information by the pointer processing circuitry, and the storing step includes storing the respective data and overhead information of the plurality of SONET signals by respective first buffers disposed in a plurality of clock domain transfer circuits.

18. The method of claim 17 wherein the processing step includes interpreting pointers of the respective SONET signals by a plurality of logical pointer interpreters included in the pointer processing circuitry.

19. The method of claim 17 wherein the processing step includes storing the respective SONET signals in a plurality of logical first-in first-out buffers included in the pointer processing circuitry.

* * * * *

UNITED STATES PATENT AND TRADEMARK OFFICE
CERTIFICATE OF CORRECTION

PATENT NO. : 6,888,826 B1
APPLICATION NO. : 09/875758
DATED : May 3, 2005
INVENTOR(S) : Gary D. Martin et al.

Page 1 of 1

It is certified that error appears in the above-identified patent and that said Letters Patent is hereby corrected as shown below:

Column 10, line 12, "1236.1" should read --236.1--; and

Column 11, line 1, "TOR" should read --TOH--.

Signed and Sealed this

Eighteenth Day of March, 2008

JON W. DUDAS
*Director of the United States Patent and Trademark Office*